3,814,619
PROCESS FOR THE MANUFACTURE OF STRUCTURAL MATERIALS
Sadao Kobayashi, Yokohama, Eiichi Tazawa, Tokyo, Mitsuro Matsunaga, Yokohama, Chikafusa Hoshino, Tokyo, and Hideo Kunisaki, Fujisawa, Japan, assignors to Mitsui Toatsu Chemicals, Inc., Tokyo, Japan
No Drawing. Filed Mar. 5, 1971, Ser. No. 121,528
Claims priority, application Japan, Mar. 9, 1970, 45/19,328; Mar. 30, 1970, 45/25,952; June 13, 1970, 45/50,731; July 10, 1970, 45/60,127
Int. Cl. B44d 1/44
U.S. Cl. 117—62                            13 Claims

ABSTRACT OF THE DISCLOSURE

A process for the manufacture of structural materials for use in the civil engineering and construction work in which a porous base material impregnated with a polymerizable substance or its mixture, optionally together with a specific additive or additives is immersed in a liquid of high viscosity which is substantially non-reactive or immiscible with said polymerizable substance, and the polymerizable substance in the thus-immersed base material is reacted together in the presence of a polymerization catalyst to obtain a structural material containing a reaction product of the polymerizable substance integrally incorporated with the base material.

BACKGROUND OF THE INVENTION

This invention relates to a process for the manufacture of structural materials for use in the civil engineering and construction work which have improved chemical properties such as a good weather-resistance, water-resistance and chemical-resistance, and improved mechanical properties such as a good wear-resistance, high bending strength and high compressive strength. More particularly, it relates to a process for the manufacture of structural materials as described above, wherein (1) a porous base material impregnated with a polymerizable substance or its mixture, optionally together with an additive or additives is immersed in a highly viscous liquid, (2) the polymerizable substance in the thus-immersed base material is reacted together in the presence of a polymerization catalyst, and/or (3) the resulting material is subjected to heat treatment under specific conditions.

DESCRIPTION OF THE PRIOR ART

Various process have been proposed heretofore in an effort to improve the chemical and mechanical properties of structural materials for use in civil engineering and construction work. The prior art processes have included (a) a method comprising adding a polymerizable substance to a raw material composition such as cement paste, thoroughly admixing the polymerizable substance and the cement paste together, and then curing the resulting mixture after casting the same to a desired shape; (b) a method comprising covering a porous base material with a layer of a high molecular material in liquid form such as a liquid of synthetic resin, and then curing the same material; and (c) a method comprising impregnating a porous base material with a polymerizable substance, and thereafter the same polymerizable substance is reacted together in a vapor phase.

According to the studies of the inventors, however, these prior art methods have been defective in that it is difficult to completely fill the microscopic voids or pores produced in the structural materials with the reaction product of the polymerizable substance due to the contraction of the porous material during curing, or the covering consisting of the high molecular material peels off the porous material, or the reaction product of the polymerizable substance does not remain on the surface of the base material due to the vaporization of the polymerizable substance from the surface of the base material.

Further, during the manufacture of the structural material by the steps of impregnating the porous base material with the polymerizable substance and then causing the reaction of the polymerizable substance in the presence of a polymerization catalyst, the volume of the reaction product produced by the reaction of the polymerizable substance is reduced with the progress of the reaction, resulting in warping or distortion of the shape of the resulting structural material; or a stress is produced in the peripheral walls of the microscopic voids or pores of the porous base material filled with the reaction product. Thus, the desired improvements in the mechanical strength such as the compressive strength and bending strength have not necessarily been sufficiently attained.

Moreover, the prior art processes have been defective in that some polymerization catalysts result in the breakdown or dimensional instability of the base material due to the reaction or chemical adsorption of the catalysts with certain materials containing calcium oxide and/or silica.

It has been found that the structural materials produced by the prior art processes described above are insufficient in the practical use, although certain improvements can be attained on the water-resistance, wear-resistance and bending strength.

SUMMARY OF THE INVENTION

It is therefore a primary object of the present invention to provide a novel and improved process for the manufacture of structural materials for use in civil engineering and construction work having improved chemical and mechanical properties over prior art structural materials in this field.

In an attempt to overcome the drawbacks of the prior art processes, the inventors have contemplated a process comprising the steps of impregnating a porous base material suitable for use in civil engineering and construction work with a polymerizable substance, and reacting the polymerizable substance without undesirable vaporization thereof from the surface of the base material, so that the reaction product of the polymerizable substance may exist throughout the base material and is integrally incorporated in the base material. As a result of this study, the inventors have discovered that a structural material having a remarkably improved wear-resistance and bending strength can be obtained by immersing the base material impregnated with the polymerizable substance in a highly viscous liquid and polymerizing the polymerizable substance in the thus immersed base material in the presence of a polymerization catalyst.

The inventors have further discovered that it is advantageous to previously add a specific additive or additives to the polymerizable substance so as to ensure the integral incorporation between the polymerization product and the porous material so as to obtain a structural material having an improved water-resistance and bending strength.

According to the process of the present invention, a structural material which is free from any warping or distortion in shape and which has a remarkably excellent compressive strength and bending strength can be obtained by eliminating the undesirable stress produced in the peripheral walls of the microscopic voids or pores of the porous material and in the reaction product of the polymerizable substance due to the volumetric contraction of the reaction product of the polymerizable substance with the progress of the reaction.

More precisely, in accordance with the present invention, there is provided a process for the manufacture of a structural material for use in civil engineering and construction work comprising the steps of (1) incorporating a porous base material with a mixture consisting of (A) a polymerizable substance, (B) optionally a specific additive or additives selected from the group consisting of (a) an aliphatic hydrocarbon having 10 to 30 carbon atoms, (b) an aliphatic alcohol having 5 to 20 carbon atoms, (c) an aliphatic ether having 6 to 40 carbon atoms in its molecule, (d) a carboxylic acid ester having 6 to 40 carbon atoms in its molecule, and (e) a carboxylate of an alkaline earth metal, and (C) at least one polymerization catalyst selected from the group consisting of (a) a compound of the general formula $$R_1\text{---}N\text{=}N\text{---}R_2 \quad (I)$$

(wherein $R_1$ and $R_2$ each represent an unsubstituted or substituted alkyl group, the latter being free from

groups), and (b) a compound of the general formula $$R_3\text{---}O\text{---}O\text{---}R_4 \quad (II)$$

(wherein $R_3$ and $R_4$ each represent an unsubstituted or substituted alkyl group, the latter being free from

groups); said components (A), (B), (C) either being already present in said base material, or being impregnated in said base material in a state in which the components (B) and (C) are mixed with the component (A); (2) immersing said base material in a highly viscous liquid which has a viscosity higher than 0.1 poise, and which does not substantially react with said mixture or is substantially immiscible with said mixture; (3) thereafter reacting the polymerizable substance below 110° C. in order to uniformly and integrally incorporate a reaction product of the polymerizable substance in said base material; and (4) further heat treating the reaction product having been polymerized to a polymerization ratio of at least 30%, within a temperature range of from 120° C. to a temperature at which the reaction product thus-produced is subjected to depolymerization, so as to obtain a structural material for use in civil engineering and construction work, which exhibits excellent chemical properties such as weather-resistance, water-resistance and chemical-resistance as well as excellent mechanical properties such as compressive strength and bending strength.

DETAILED DESCRIPTION

As the preferred base materials of the present invention may be mentioned such materials as cementitious materials, e.g., cement paste, mortar or concrete; gypsum-series materials; lime-series materials; a material of the pozzolan group such as fly ash, slag, natural pozzolan or diatomaceous earth, and mixtures of at least two of these materials; which materials can be cast in the desired shape by allowing the same to stand at room temperature or by heat treating, for example, by subjecting the materials to a heat treatment in air, to a steam treatment or to an autoclave treatment.

Known reinforcing materials such as reinforcing bars, glass fibers, plastic fibers, or natural fibers may be added to the base materials. Further, at least one of the commercial additives used for concrete materials may be employed, such as a water-reducing agent, and air mixing agent or AE agents. Similarly, foaming agents, expanding agents, accelerating agents, retarding agents and bleeding reducing agents may also be added to the base materials.

As the polymerizable substance preferably used in the present invention may be mentioned such materials as monomers which have unsaturated bonds and which can be polymerized in the presence of a polymerization catalyst; the so-called prepolymers formed by partial polymerization of these monomers, and mixtures of these monomers and prepolymers. Typical monomers include vinyl compounds such as styrene, acrylonitrile or vinyl acetate; diene compounds such as butadiene, chloroprene or isoprene; and divinyl compounds such as divinylbenzene or ethylene glycol dimethacrylate.

The prepolymers generally used in the present invention are preferably those having fluidity, and wherein at least one of the liquid prepolymers has a viscosity lower than 50 poises and a low polymerization ratio. In the present invention, the amount of the polymerizable substance is preferably 3 to 30% by weight relative to the impregnated portion of the base material before impregnation.

The polymerization catalysts preferably used in the present invention are organic or inorganic peroxides, such as lauroyl peroxide, benzoyl peroxide, tertiary butyl perbenzoate, isopropyl-peroxy-carbonate, hydrogen peroxide and potassium persulfate. Apart from these, azobisisobutyronitrile may also be used.

In order to avoid undesirable breakdown of the materials and to improve the dimensional stability of the same, compounds of the above formula (I) such as azo-2-methyl-2-propane, azo-2-phenyl-2-propane, azo-2-propane or azobisisobutyronitrile are preferably used as the polymerization catalysts. In the present invention, $R_1$ and $R_2$ in the same formula (I), are, for example, an unsubstituted alkyl group such as a methyl group, an ethyl group, a propyl group, an isopropyl group or a tertiary butyl group, a substituted alkyl group such as an isobutyronitrile group, a benzyl group or a cumyl group. Accordingly, the compounds of the same formula (I) are preferably those wherein $R_1$ and $R_2$ represent the same or different groups mentioned above.

Compounds of the general formula (II) such as diethyl peroxide, 2,5-dimethyl-2,5-di(tertiary-butyl-peroxy)-hexane, di-cumyl peroxide, tertiary-butyl-cumyl-peroxide, or di-tertiary-butyl peroxide are also preferably used as the catalyst. In the present invention $R_3$ and $R_4$ in the same formula (II) are, for example, an unsubstituted alkyl group such as an ethyl group, a propyl group or a tertiary butyl group, or a substituted alkyl group such as a benzyl group or a cumyl group. Accordingly, the compounds of the same formula (II) are preferably those wherein $R_3$ and $R_4$ represent the same or different groups mentioned above.

There are various methods for introducing the polymerization catalyst into the base materials. In one method, the base material is impregnated with a mixture consisting of the polymerizable substance and the polymerization catalyst, while in another method, a mixture consisting of the polymerizable substance and the polymerization catalyst is added to the raw material composition of the base materials prior to pre-casting, and after thoroughly mixing the raw material composition and the catalyst together, the raw material composition including the mixture therein is cast into the desired shape so that the base material previously includes the polymerization catalyst therein. The amount of these polymerization catalysts is generally 0.1 to 8 parts by weight relative to 100 parts by weight of the polymerizable substance.

In the present invention, known reaction accelerators, for example organic amino compounds such as N,N'-dimethylaniline, dimethyl-p-toluidine; or an organic metal salt such as cobalt naphthalate or manganese octate may be used to accelerate the reaction of the polymerizable substance. This reaction accelerator coexists with the polymerization catalyst and accelerates the reaction of the polymerizable substance. The amount of these reaction accelerators may be generally less than 50% by weight of the polymerization catalyst.

The highly viscous liquid used in the present invention is preferably a liquid which has a viscosity of higher than 0.1 poises at the working temperature and does not react with the base materials to destroy the same. Further, this fluid is an organic or inorganic compound which does not substantially react with the polymerizable substance impregnated in the base material and is substantially immiscible with the polymerizable substance. An aqueous solution of sodium alginate, water glass, glycerine, ethylene glycol and silicon oil are typical examples of liquids suitable in the present invention.

The specific additives preferably used for the purpose of improving the water resistance and bending strength are as follows:

(1) Aliphatic hydrocarbons having 10 to 30 carbon atoms, such decane, undecane, tetradecane, liquid paraffins, 1-tetradecene, 1-undecene, octadecane, eicosane, and 1-nonadecene.

(2) Aliphatic alcohols having 3 to 20 carbon atoms such as octyl alcohol, decyl alcohol, lauryl alcohol, stearyl alcohol, butanediol, hexanediol and glycerine.

(3) Aliphatic ethers having 6 to 40 carbon atoms in the molecule, such as dibutyl ether, diamyl ether, dihexyl ether and amylhexyl ether.

(4) Carboxyl esters having 6 to 40 carbon atoms in the molecule, such as butyl stearate, diheptyl phthalate, di-2-ethylhexyl adipate, ethylene glycol dibenzoate, dioctyl sebacate, octyl-epoxy stearate, and a glycerine ester of a higher aliphatic acid such as lauric acid, palmitic acid, stearic acid or oleic acid.

(5) Carboxylates of alkaline earth metals, such as calcium propionate, magnesium stearate, barium stearate, calcium laurate, calcium linoleate, calcium phthalate, calcium sebacate, and calcium azelate.

The mixing of the specific additive into the base material in the present invention is generally carried out by a method in which the additive is mixed with the raw material composition of the porous material during the pre-casting of the porous material, that is, a method in which the additive is mixed into the base material in the course of the manufacture of the base material, or a method in which the additive is mixed with the polymerizable substance and the polymerization catalyst, and the mixture thereof is impregnated in the pre-cast porous material. The amount of the additives is generally 1 to 15% by weight, relative to the amount of the polymerizing material.

In the present invention, it is required that the polymerizable substance impregnated in the porous material be reacted at a temperature lower than 110° C. The study of the inventors has clarified that, in order to improve the chemical and mechanical properties of the structural materials for use in civil engineering and construction work, the polymer produced by the reaction of the polymerizable substance must have a large molecular weight, and to achieve this end the reaction temperature must be lower than 110° C. This is because, when the reaction temperature of the polymerizable substance exceeds 110° C., the molecular weight of the resulting polymer is extremely reduced and the improvements in the chemical and mechanical properties of the structural material thus-obtained cannot be attained to a degree sufficient enough for its practical use in civil engineering and construction work. It is preferred that the reaction of the polymerizable substance be carried out in a heating vessel in such a manner that the base material, being impregnated with or already including therein the polymerizable substance, the polymerization catalyst, and optionally a specific additive or additives, is uniformly heated to be maintained at a constant temperature.

The molecular weight of the polymer produced by the reaction of the polymerizable substance can be increased when it is reacted at a reaction temperature below 110° C. as described above. However, in order to attain the desired improvements in the chemical and mechanical strength of the structural material for use in civil engineering and construction work, which is the principal purpose of the present invention, the polymer having such a large molecular weight must be present in a percentage which amounts to at least 30% of the polymerizable substance impregnated in the base material. Although the possibility of obtaining such a polymerization ratio is dependent upon the type of polymerizable substance, the type of polymerization catalyst, the amount of these materials, etc., the porous material impregnated with the polymerizable substance may be generally allowed to stand for 3 to 20 hours in the reaction temperature range described above in the presence of the polymerization catalyst.

In the process according to the present invention, the conditions of heat treatment for the reaction product obtained in the above-described manner must be such that the internal stress produced in the peripheral walls of the microscopic pore structure of the porous material and in the polymer produced by the reaction of the polymerizable substance due to the contraction in the volume of the polymerizable substance can be removed by heating the polymer to soften the same so as to remove the stress existing in the polymer. It has been found that such conditions can be satisfied when the lower limit of the temperature range of heat treatment is set at 120° C. and the upper limit is set at either the depolymerizing temperature of the polymer or 300° C., whichever is lower.

The heat treatment should be carried out within the temperature range specified above because, when the heat treatment is carried out at a temperature higher than the upper limit specified above, the desired improvements in the chemical and mechanical properties of the structural material cannot be attained due to deterioration of the polymer resulting from thermal decomposition, while when the heat treatment is carried out at a temperature lower than the lower limit specified above, the desired improvements in the chemical and mechanical properties of the structural material cannot be also attained due to the fact that the stress existing in the polymer cannot be removed.

In the present invention, the reaction product may be heat-treated by heating with a hot gas such as hot air, hot nitrogen or steam, or by heating with a hot liquid such as hot glycerine or hot ethylene glycol. In addition to the above means, heating with infrared rays or microwaves is also acceptable. While the period of time required for the heat treatment is variable depending on the method of heating and the size of the reaction product, a heat treatment duration of from about 30 minutes to 4 hours within the above specified temperature range is generally sufficient.

The inventors have investigated the factors described below in an attempt to obtain the improvements in the wear resistance and bending strength of the structural material for use in civil engineering and construction work. The investigation of these factors is of special significance in the present invention as will be described in detail below.

These factors will now be enumerated as follows:

(1) The microscopic voids or pores existing on the surface of the base material among numerous microscopic voids or pores existing in the same base material, and the reaction product must make a firm and intimate bond with the base material.

(2) In the course of impregnating the base material with the polymerizable substance and then causing the reaction of the polymerizable substance to bond the reaction product firmly and integrally to the base material, there occurs a phenomenon such that the polymerizable substance vaporizes from the surface of the base material so as to escape to the exterior, or the polymerizable substance in the base material is replaced with the fluid present in the vicinity of the base material whereby the fluid intrudes into the said material. In any of these cases, the amount of the polymerizable substance filled into the surface portion of the base material is reduced, with the result that the proportion of the reaction products of the polymerizable substance occupying the surface portions of the base material is reduced, thereby extremely diminishing the effect of improvements in the physical properties of the structural material. Therefore, it is necessary to avoid the occurrence of this phenomenon as described above, which phenomenon brings about the reduction of the amount of the polymerizable substance on the surface portions of the base material.

(3) The polymerizable substance must be reacted and cured to be integrally bonded to the base material so that the polymerizable substance and the polymerization catalyst impregnated in the surface portions of the base material fill the microscopic voids or pores existing on the surface portions of the base material.

The requirements (1), (2) and (3) described above can be satisfied in a manner as will be described hereinafter. More precisely, the polymerizable substance is impregnated in the base material in the state in which the polymerization catalyst is previously included in the base material or is mixed with the polymerizable substance, and then the base material is immersed in a highly viscous liquid which has a viscosity higher than 0.1 poise and is unreactive and immiscible with the polymerizable substance. In this immersed state, the polymerizable substance in the base material is caused to react under a suitable selected temperature condition so as to integrally bond the reaction product of the polymerizable substance to the base material. By virtue of the use of the highly viscous liquid, (a) the undesirable vaporization of the polymerizable substance impregnated in the base material escaping from the surface of the base material can be avoided, and (b) the highly viscous liquid having such a high viscosity does not substantially replace the polymerizable substance existing in the microscopic voids or pores in the surface portions of the material. The fact that the reduction of the polymerizable substance on the surface portions of the base material can be avoided for the above two reasons is especially important in the present invention. In the present invention, a highly viscous material may be used under pressure so as to more effectively avoid the vaporization and the escape of the polymerizable substance from the base material.

Further, in the present invention, specific additives as previously described are used for the purpose of improving the water-resistance and bending strength. The merits of the specific additives will be apparent from several embodiments described hereinafter. Therefore, it is of important significance in the present invention to use the specific additives as incorporated in the base material.

The fact that the base material and the reaction product of the polymerizable substance are firmly and integrally bonded together was proven by a test made on the structural materials of the present invention according to the method of measurement specified in the Japanese Industrial Standard (JIS) R5201—1956. In the test, the fracture surface showed that the reaction product was integrally bonded to the base material. In the case of structural materials which were made according to a process similar to the present invention, but in which the specific additives of the present invention were not used, a test for measuring the bending strength according to the same measuring method shows that the reaction product peels off the base material on the fracture surface. Thus, in these materials, the bond between the base material and the reaction product was very weak and they were not bonded together sufficiently to form an integral part.

Further, according to the investigation of the inventors, the microscopic voids or pores existing in the porous material must be fully filled with the polymer produced by the reaction of the polymerizable substance for attaining the improvements in the chemical and mechanical properties of the porous material, and the polymer itself must have sufficient chemical and mechanical properties as previously mentioned. In order to increase the chemical and mechanical properties of the polymer produced by the reaction of the polymerizable substance, the molecular weight of the polymer must be greater, and this can be attained by causing polymerization of the polymerizable substance impregnated in the porous material at a temperature lower than 110° C. in the presence of the polymerization catalyst. However, the volume of the polymer produced by the reaction of the polymerizable substance is generally reduced by about 20 to 40% as compared with that of the polymerizable substance, and due to the above fact, the polymer is not necessarily distributed uniformly when the polymerizable substance in the present invention is reacted at a temperature lower than 110° C. As a result, warping or distortion may occur in the structural material due to the stress produced in the polymer and in the peripheral walls of the microscopic voids or pores of the porous material, and these mechanical stresses cannot be removed by heating at a temperature lower than 110° C. In other words, although the polymer produced by the reaction of the polymerizable substance impregnated in the porous material below 110° C. in the presence of the polymerization catalyst has a large molecular weight, the reaction product of such a large molecular weight does not have a sufficiently improved chemical and mechanical properties in that form.

According to the process of the present invention, the reaction product thus obtained is subjected to heat treatment within a temperature range of from 120° C. to either the decomposing temperature of the polymer produced by the reaction of the polymerizable substance or 300° C., whichever is lower, so as to remove the stress in the reaction product and to remarkably improve the mechanical strength such as the compressive strength and bending strength so as to obtain a structural material free from any warping of the shape thereof. According to the investigation of the inventors into ways of avoiding the breakdown of the base material and improving the dimensional stability of the base material, the specific compounds of the general formulas (I) and (II) do not substantially react with or are not chemically adsorbed by the porous base material obtained by pre-casting in a conventional method the raw material composition containing at least one of the components of calcium oxide and silica. However, in the specific compounds of the general formulas (I) and (II), those excluded from the scope of the present invention are substantially and chemically adsorbed by the base material, and such materials are therefore inappropriate for the manufacture of the concrete-polymer composite, which composite should be free from damage and have an excellent dimensional stability. Therefore, the conditions set forth in the present invention with regard to $R_1$, $R_2$, $R_3$ and $R_4$ in the general formulas (I) and (II) described previously have a very important significance.

It will be understood from the detailed description given hereinabove, that the polymerizable substance impregnated in the base material is prevented from escaping outwardly from the surface portions of the base material, and by virtue of the addition of the specific additive to the polymerizable substance, the base material and the reaction product can be sufficiently and integrally bonded to each other. Thereafter, the reaction product is subjected to heat treatment so as to remove the stress in the reacion product, which stress leads to undesirable warping and distortion. The wear-resistance, water-resistance, the compressive strength and the blending strength of the structural material thus obtained can be remarkably improved, as will be apparent from several embodiments of the present invention described below.

The following are specific embodiments of the present invention, which embodiments are designed to illustrate, but not to limit the scope of the present invention.

was maintained for the designated period of time to obtain structural materials, to be compared with those according to the present invention.

The wear-resistance measured with respect to these materials by the wearing test were as shown in Table 1. The rod method was employed in the wearing test for the measurement of wear-resistance of the base materials. More precisely, in each of the tests Nos. 1 and 2, each of the six base materials was mounted on a wear tester and was subjected to the wearing test for 3 hours to measure the amount of wear. The volume in mm.$^3$ worn away per cm., that is, the coefficient of wear was sought for each base material, and an average value of the wear-coefficient of the six materials was calculated. As apparent from Table 1, the structural materials according to the present invention (test No. 1) have a remarkably improved wear-resistance over the structural materials (test No. 2) manufactured for the sake of comparison.

TABLE I

| Test number | 1 | 2 (Reference) |
|---|---|---|
| Base material: | | |
| Composition | Mortar | Mortar. |
| Size | Thickness: 40 mm. Width: 145 mm. Length: 297 mm. | Thickness: 40 mm. Width: 145 mm. Length: 297 mm. |
| Polymerizable substance: | | |
| Composition | Methyl methacrylate | Methyl methacrylate. |
| Percent by weight relative to base material | 14.2 [1] | 14.4.[1] |
| Reaction loss, percent | 1.5 [1] | 60.3.[1] |
| Polymerization catalyst: | | |
| Composition | Benzoyl peroxide | Benzoyl peroxide. |
| Percent by weight relative to polymerizable substance | 2.0 | 2.0. |
| Highly viscous liquid: | | |
| Composition | Water glass | ($N_2$ atmosphere.) |
| Temperature (° C.) | 70 | |
| Viscosity (poise) | 10 | |
| Treating conditions: | | |
| Reaction temperature (° C.) | 70 | 70. |
| Reaction time (hr.) | 20 | 20. |
| Wearing test: Wear coefficient (after 3 hours) | 82 [1] | 512.[1] |

[1] Average of six specimens.

EXAMPLE 1

Base materials shown in Table 1 were made by thoroughly mixing 20.8 kg. of cement, 41.6 kg. of fine aggregate, and 13.52 kg. of water together, casting the mixture into twelve molds 40 mm. thick, 145 mm. wide and 297 mm. long, curing the mixture for 24 hours and removing the castings from the molds.

The base materials thus-obtained were subjected to a wearing test.

In test No. 1 shown in Table 1, a polymerization catalyst of the kind shown in Table 1 was mixed with a polymerizable substance as shown in Table 1 in the proportions shown therein, and six base materials among the twelve base materials made by the method described above were impregnated with this mixture so that the polymerizable substance in the mixture was impregnated in the base materials in the proportions shown in the table. Then, the base materials impregnated with this mixture were immersed in a highly viscous liquid as shown in Table 1 and were treated under the conditions shown in the table to obtain structural materials according to the present invention.

In test No. 2 shown in Table 1, a polymerization catalyst was mixed with a polymerizable substance in the proportions shown therein, and the remaining six base materials were impregnated with this mixture so that the polymerizable substance in the mixture was impregnated in the base materials in the proportions shown in Table 1. Then, the base materials were directly placed in a reaction vessel, and while introducing nitrogen therein, the base materials were indirectly heated until the temperature within the reaction vessel reached the reaction temperature shown in said table. The reaction temperature

EXAMPLE 2

Base materials shown in Table 2 were made by thoroughly mixing 35.0 kg. of cement, 76.0 kg. of fine aggregate, 112.0 kg. of coarse aggregate and 15.1 kg. of water together, casting the mixture into twelve square columnar molds of 100 cm.$^2$ in cross section and 40 cm. long, allowing the mixture to cure for 24 hours and removing the castings from the molds.

The base materials thus obtained were subjected to a bending test.

In test No. 1 shown in Table 2, a polymerization catalyst was mixed with a polymerizable substance as shown in the table, and six base materials among the twelve made by the method described above were impregnated with this mixture so that the polymerizable substance was impregnated in the base materials in the proportions shown therein. Then, the base materials were immersed in a highly viscous liquid and were treated under the conditions shown in Table 2 to obtain the structural materials of the present invention.

In test No. 2 shown in Table 2, a polymerization catalyst of the kind shown therein was mixed with a polymerizable substance in the proportions shown in the table, and the remaining six base materials were impregnated with this mixture so that the polymerizable substance in the mixture was impregnated in the base materials in the proportions shown. Then, the base materials were directly placed in a reaction vessel, and while introducing nitrogen into the reaction vessel, the base materials were indirectly heated by a heating medium flowing through a heating jacket fixed to the vessel until the temperature within the vessel reached the reaction temperature shown in the table. The reaction temperature was maintained for the designated period of time to obtain structural materials to be compared with those produced according to the present invention.

The measured values of the bending strength obtained by the bending test were as shown in the table. The measurement of the bending strength of the structural materials was carried out in accordance with the method specified in Japanese Industrial Standards (JIS) A1106—1964, and an average of the bending strength of the six materials was calculated. As apparent from Table 2, the structural materials according to the present invention (test No. 1) have a remarkably improved bending strength over the materials (test No. 2) manufactured for reference.

previous description. Thus, a polymerization catalyst of the kind shown in Table 3 was mixed with a polymerizable substance in the proportions shown in the table, and the base materials were impregnated with this mixture so that the polymerizable substance was impregnated in the base materials in the specified proportions.

The base materials of tests Nos. 1 through 10, thus impregnated with the respective mixture, were each wrapped with a polypropylene film and were treated under the treating conditions shown in Table 3. As a result, the polymerizable substance was reacted in each of the base materials to provide structural materials having the chemical and physical properties designated therein.

The base materials of the tests Nos. 11 and 12 were

TABLE 2

| Test number | 1 | 2 (Reference) |
|---|---|---|
| Base material: | | |
| Composition | Concrete | Concrete. |
| Size | Cross section: 100 cm.$^2$ Length: 40 cm | Cross section: 100 cm.$^2$ Length: 40 cm. |
| Polymerizable substance: | | |
| Composition | 70% styrene, 30% acrylontrile | 70% styrene, 30% acrylonitrile. |
| Percent by weight relative to base material | 6.65 | 6.68. |
| Reaction loss, percent | 1.6 | 56.2. |
| Polymerization catalyst: | | |
| Composition | Lauroyl peroxide | Lauroyl peroxide. |
| Percent by weight relative to polymerizable substance | 2.0 | 2.0. |
| Highly viscous liquid: | | |
| Composition | Glycerine | (N$_2$ atmosphere.) |
| Temperature (° C.) | 50 | |
| Viscosity (poise) | 1.8 | |
| Treating conditions: | | |
| Reaction temperature (° C.) | 50 | 50. |
| Reaction time (hr.) | 24 | 24. |
| Bending strength (kg./cm.$^2$) | 153 [1] | 48.[1] |

[1] Average of six specimens.

EXAMPLE 3

Base materials shown in Table 3 were pre-cast and afterwards treated in the following manner: Each of the base materials designated by the test Nos. 1, 2, 3, 4, 5, 6, 7, 8, 11 and 12 was made by thoroughly mixing 1040 g. of portland cement, 2080 g. of standard sand 676 g. of water together, molding the mixture into the respective sizes shown in Table 3, and removing the castings from the molds after 24 hours. On the other hand, the base materials designated by the test Nos. 9 and 10 were made by thoroughly mixing 1040 g. of portland cement, 2080 g. of standard sand, 676 g. of water and 26 g. of calcium stearate together, molding the mixture into the respective sizes shown in Table 3, removing the castings from the molds after 24 hours. The base materials thus pre-cast were then dried at 110° C. for 24 hours and were subjected to a water permeability test, a water absorption test and a bending test.

In test Nos. 1, 2, 3, 4, 5, 6, 7 and 8 shown in Table 3, the specified additives were mixed with the polymerizable substance in the proportions shown in the table, and a polymerization catalyst was mixed with the above mixture in the proportions set forth in the table to obtain various mixtures to be applied to the base materials of the test Nos. 1, 2, 3, 4, 5, 6, 7 and 8, respectively. These base materials of mortar shown in Table 3 were then impregnated with the respective mixtures so that the polymerizable substance in the mixture wes impregnated in the base materials in the specified proportions.

In the case of the base materials of the tests Nos. 9 and 10, they include already therein the additive employed in the present invention as apparent from the made for the purpose of comparison with those made according to the present invention. The base materials of tests Nos. 11 and 12 were similar to those of the tests Nos. 1 and 2 except that the additive according to the present invention was not used therein. These base materials were impregnated with a mixture of a polymerizable substance and a polymerization catalyst which was the same as that used in tests Nos. 1 and 2, and were treated under the treating conditions shown in Table 3.

The results of the water permeability test, the water absorption test and the bending test performed on the structural materials thus obtained are shown in Table 3. The water permeability test was carried out for the purpose of comparing the water-resistance of these base materials, and the method of the test was based on JIS A5402—1960. In the water absorption test the structural materials were immersed in a water vessel maintained at a constant water temperature of 30° C. for a predetermined period of time, and after removing the structural materials from the water vessel, the weight of the structural materials was measured to find the increase in weight relative to the weight before immersion in water. Thus, the water absorption rate represents the percentage of the weight increase relative to the weight before immersion.[1] The bending strength after repeated freezing and thawing was also measured. More precisely, the bending strengths of the structural materials were measured after the materials were subjected to eight cycles per day of freezing and thawing for 50 days, which amounts to a total of 400 cycles of freezing and thawing in accordance with the method specified in ASTM C-290-61J.

---

[1] The bending strength was measured by the method specified in JIS R5201—1965.

TABLE 3

| Test number | 1 | 2 | 3 | 4 | 5 | 6 |
|---|---|---|---|---|---|---|
| Base material: | | | | | | |
| Composition | Mortar | Mortar | Mortar | Mortar | Mortar | Mortar. |
| Size | Diam.: 15 cm, Thickness: 5 cm | Section: 16 cm².  Length: 16 cm | Diam.: 15 cm, thickness: 5 cm | Section: 16 cm². Length: 16 cm | Diam.: 15 cm. Thickness: 5 cm. | Section: 16 cm². Length: 16 cm. |
| Polymerizable substance: | | | | | | |
| Composition | Methyl methacrylate. | Methyl methacrylate. | Methyl methacrylate. | Methyl methacrylate. | Methyl methacrylate. | Methyl methacrylate. |
| Percent by weight relative to base material | 14.0 | 14.3 | 14.3 | 14.6 | 14.3 | 14.3. |
| Reaction loss, percent | 1.65 | 1.63 | 1.73 | 1.65 | 1.68 | 1.71. |
| Additive: | | | | | | |
| Composition | Liquid paraffin | Liquid paraffin | Stearyl alcohol | Stearyl alcohol | Dihexyl ether | Dihexyl ether. |
| Percent by weight relative to polymerizable substance | 5 | 5 | 5 | 5 | 5 | 5. |
| Polymerization catalyst: | | | | | | |
| Composition | Lauroyl peroxide | Lauroyl peroxide | Lauroyl peroxide | Lauroyl peroxide | Lauroyl peroxide | Lauroyl. peroxide. |
| Percent by weight relative to polymerizable substance | 1 | 1 | 1 | 1 | 1 | 1. |
| Treating conditions: | | | | | | |
| Atmosphere | Water | Water | Water | Water | Water | Water. |
| Temperature (° C.) | 80 | 80 | 80 | 80 | 80 | 80. |
| Reaction time (hr.) | 20 | 20 | 20 | 20 | 20 | 20. |
| Properties of the resulting structural material: | | | | | | |
| Water permeability, percent | 0.10 | 0.25 | 0.19 | | | |
| Water absorption rate, percent after— | | | | | | |
| 1 day | 0.08 | | 0.15 | | 0.16 | |
| 3 months | 0.12 | | 0.31 | | 0.15 | |
| 6 months | 0.12 | | 0.31 | | 0.25 | |
| Bending strength (kg./cm.²) after— | | | | | | |
| 1 day | | 325 | | 340 | | 343. |
| Repeated freezing and thawing | | 318 | | 335 | | 340. |

References

| Test number | 7 | 8 | 9 | 10 | 11 | 12 |
|---|---|---|---|---|---|---|
| Base material: | | | | | | |
| Composition | Mortar | Mortar | Mortar | Mortar | Mortar | Mortar.. |
| Size | Diam.: 15 cm, Thickness: 5 cm | Section: 16 cm². Length: 16 cm | Diam.: 15 cm. Thickness: 5 cm. | Section: 16 cm². Length: 16 cm. | Diam.: 15 cm. Thickness: 5 cm. | Section: 16 cm.² Length: 16 cm. |
| Polymerizable substance: | | | | | | |
| Composition | Methyl methacrylate. | Methyl methacrylate. | Methyl methacrylate. | Methyl methacrylate. | Methyl methacrylate. | Methyl methacrylate. |
| Percent by weight relative to base material | 14.4 | 14.8 | 14.8 | 14.9 | 14.1 | 14.2. |
| Reaction loss, percent | 1.73 | 1.74 | 1.69 | 1.73 | 1.68 | 1.69. |
| Additive: | | | | | | |
| Composition | Dioctyl sebacate. | Dioctyl sebacate. | Calcium stearate. | Calcium stearate. | | |
| Percent by weight relative to polymerizable substance | 5 | 5 | 5 | 5 | | |
| Polymerization catalyst: | | | | | | |
| Composition | Lauroyl peroxide. | Lauroyl peroxide. | Lauroyl peroxide. | Lauroyl peroxide. | Lauroyl peroxide. | Lauroyl peroxide. |
| Percent by weight relative to polymerizable substance | 1 | 1 | 1 | 1 | 1 | 1. |
| Treating conditions: | | | | | | |
| Atmosphere | Water | Water | Water | Water | Water | Water. |
| Temperature (° C.) | 80 | 80 | 80 | 80 | 80 | 80. |
| Reaction time (hr.) | 20 | 20 | 20 | 20 | 20 | 20. |
| Properties of the resulting structural material: | | | | | | |
| Water permeability, percent | 0.14 | | 0.26 | | 0.97 | |
| Water absorption rate, percent after— | | | | | | |
| 1 day | 0.10 | | 0.21 | | 0.78 | |
| 3 months | 0.18 | | 0.39 | | 1.51 | |
| 6 months | 0.18 | | 0.40 | | 1.74 | |
| Bending strength (kg./cm.²) after— | | | | | | |
| 1 day | | 362 | | 302 | | 221. |
| Repeated freezing and thawing | | 361 | | 296 | | 197. |

NOTE.—The properties shown in the table are an average of 10 structural materials subject to the tests.

EXAMPLE 4

Base materials shown in Table 4 were pre-cast and thereafter treated in the following manner: Two base materials were prepared for each of the test Nos. 1 and 5. These base materials were made by thoroughly mixing 520 g. of cement, 1040 g. of standard sand and 338 g. of water together, casting the mixture into two molds of 16 cm.² in cross section and 16 cm. long to obtain a total of four castings of the size shown by tests Nos. 1 and 5 in Table 4, and removing the cured castings from the molds after 24 hours.

Similarly, two base materials were prepared for each of the tests Nos. 2 and 6. These base materials were made by thoroughly mixing 1000 g. of gypsum and 500 g. of water together, casting the mixture into two molds of 16 cm.² in cross section and 16 cm. long to obtain a total of four castings of the size shown by tests Nos. 2 and 6, and removing the cured castings from the molds after 24 hours.

Also, two base materials were prepared for each of tests Nos. 3, 4, 7 and 8. These base materials were made by thoroughly mixing together 7.0 kg. of cement, 15 kg. of river sand, 22.4 kg. of crushed limestone less than 20 mm. in size, casting the mixture into two square columnar molds of 100 cm.² in cross section and 40 cm. long and two circular columnar molds of 10 cm. in diameter and 20 cm. long to obtain a total of eight castings of the size shown by tests Nos. 3, 7, 4 and 8 in Table 4, and removing the cured castings from the molds after 24 hours.

In tests Nos. 1, 2, 3 and 4 among tests Nos. 1 through 8, polymerization catalysts as shown in Table 4 were mixed with polymerizable substances as shown in Table 4 in the designated proportions, and the mixtures were impregnated in the respective sets of the base materials in the specified proportions. Then, the base materials were each wrapped with a polypropylene film, and the polymerizable substance impregnated therein was reacted under the reaction conditions shown in Table 4. One of the two base materials prepared for each of the tests Nos. 1, 2, 3 and 4 was treated under the treating conditions shown therein to obtain structural materials according to the present invention, which materials were used for the measurement of the mechanical strength, while the remaining one of the two base materials for each of the tests Nos. 1, 2, 3 and 4 was used for the measurement of the polymerization ratio.

In test Nos. 5, 6, 7 and 8, polymerization catalysts as shown in Table 4 were mixed with polymerizable substances as shown in Table 4 in the proportions shown therein, and the mixtures were impregnated in the respective sets of the base materials in the proportions shown in Table 4. Then, the polymerizable substances impregnated in these base materials were reacted under the reaction conditions shown in Table 4 to obtain structural materials to be compared with the structural materials according to the present invention. One of the two structural materials prepared for each of the tests Nos. 5, 6, 7 and 8 was used for the measurement of the mechanical strength, while the remaining one of the two materials for each of the tests Nos. 5, 6, 7 and 8 was used for the measurement of the polymerization ratio.

The compressive strength and bending strength were measured on the structural materials of the tests Nos. 1, 2, and 5 and 6 in accordance with the method specified in JIS R5201—1956. The bending strength was measured on the structural materials of tests Nos. 3 and 7 in accordance with the method specified in JIS A1106—1964, while the compressive strength was measured on the structural materials of the tests Nos. 4 and 8 in accordance with the method specified in JIS A1108—1964.

Each of the structural materials made in the manner described above was crushed into powders which were then dissolved into methyl ethyl ketone to extract the polymer component. Methyl alcohol was then added to the extract so as to precipitate the polymer component. After filtering the polymer component by a glass filter, the polymer component was dried under a vacuum below 10 mm. Hg at 60° C. for two days and the weight of the polymer component was measured. The percentage of the weight of the polymer relative to the weight of the polymerizable substance impregnated in the base material was calculated to obtain the polymerization ratio shown in Table 4. Further, the depolymerizing temperature of the polymer thus-produced was measured in an atmosphere of nitrogen by means of a differential thermometer. The temperature for depolymerization is shown in Table 4.

It will be apparent from Table 4 that the structural materials according to the present invention shown in tests Nos. 1, 2, 3 and 4 have a remarkably improved mechanical strength over the structural materials of tests Nos. 5, 6, 7 and 8 manufactured for reference.

TABLE 4

| Test number | 1 | 2 | 3 | 4 | 5 | 6 | 7 | 8 (Reference) |
|---|---|---|---|---|---|---|---|---|
| Base material: | | | | | | | | |
| Composition | Mortar | Gypsum | Concrete | Concrete | Mortar | Gypsum | Concrete | Concrete |
| Size | Section: 16 cm.²; Length: 16 cm. | Section: 16 cm.²; Length: 16 cm. | Section: 100 cm.²; Length: 40 cm. | Diam.: 10 cm.; Length: 20 cm. | Section: 16 cm.²; Length: 16 cm. | Section: 16 cm.²; Length: 16 cm. | Section: 100 cm.²; Length: 40 cm. | Diam.: 10 cm.; Length: 20 cm. |
| Polymerizable substance: | | | | | | | | |
| Composition | 70% styrene, 30% acrylonitrile | 70% styrene, 30% acrylonitrile | Methyl methacrylate | Methyl methacrylate | 70% styrene, 30% acrylonitrile | 70% styrene, 30% acrylonitrile | Methyl methacrylate | Methyl methacrylate |
| Percent by weight relative to base material | 14.1 | 27.2 | 5.6 | 5.7 | 14.3 | 27.4 | 5.7 | 5.7 |
| Polymerization catalyst: | | | | | | | | |
| Composition | Lauroyl peroxide | Lauroyl peroxide | Benzoyl peroxide | Benzoyl peroxide | Lauroyl peroxide | Lauroyl peroxide | Benzoyl peroxide | Benzoyl peroxide |
| Percent by weight relative to polymerizable substance | 2.0 | 2.0 | 3.0 | 3.0 | 2.0 | 2.0 | 3.0 | 3.0 |
| Reaction conditions: | | | | | | | | |
| Atmosphere | Glycerine | Glycerine | Glycerine | Glycerine | Glycerine | Glycerine | Glycerine | Glycerine |
| Temperature (° C.) | 60 | 60 | 80 | 80 | 60 | 60 | 80 | 150 |
| Time (hr.) | 6 | 6 | 5 | 5 | 6 | 6 | 5 | 5 |
| Polymerization ratio [a] | 98.5 | 92.4 | 75.4 | 75.8 | 98.9 | 92.4 | 76.3 | 94.6 |
| Heat treatment conditions: | | | | | | | | |
| Heating medium | Air | Air | Glycerine | Glycerine | Glycerine | Glycerine | Glycerine | Glycerine |
| Temperature (° C.) | 180 | 180 | 150 | 150 | | | | 150 |
| Time (hr.) | 3 | 3 | 4 | 4 | | | | 4 |
| Depolymerizing temp. (° C.) [b] | 420 | 420 | 340 | 340 | | | | 315 |
| Mechanical properties: | | | | | | | | |
| Compressive strength (kg./cm.²) | 1,680 | 890 | 1,290 | 1,310 | | 610 | | 620 |
| Bending strength (kg./cm.²) | 340 | 196 | 178 | 224 | | 120 | 135 | |

[a] The polymerization ratio was separately measured.
[b] The depolymerizing temperature was measured by means of a differential therometer.

EXAMPLE 5

Base materials shown in Table 5 were pre-cast and treated in the following manner: Two base materials were prepared for each of the tests Nos. 1 and 2. These base materials were made be thoroughly mixing 20.4 kg. of cement, 41.6 kg. of standard sand, 13.5 kg. of water together, casting the mixture into four molds 2 cm. thick, 20 cm. wide and 100 cm. long to obtain a total of four castings of the size shown in Table 5, allowing the castings to stand for 24 hours, curing the castings with steam at 65° C. for 6 hours, and removing the castings from the molds.

In tests Nos. 1 and 2, a polymerization catalyst as shown in Table 5 was mixed with a polymerizable substance in the proportions shown in the table, and the mixture was impregnated in the base materials in the specified proportions. Then, the base materials were each wrapped with a polypropylene film, and the polymerizable substance impregnated in the materials was reacted under the conditions shown in Table 5. Two of the four base materials were then subjected to heat treatment under the conditions shown in the table to obtain structural materials according to the present invention. One of these two base materials was used for the measurement of the polymerization ratio, while the other was used for the measurement of the mechanical strength. The test results of these two structural materials according to the present invention are shown in test No. 1 in Table 5.

On the other hand, the remaining two base materials were not subjected to heat treatment, and the mechanical strength and the polymerization ratio of these two structural materials were measured, respectively. The test results of these two materials are shown in test No. 2 in Table 5 for the purpose of comparison with the structural materials according to the present invention. The polymerization ratio and the deploymerizing temperature were measured in a manner similar to that described in Example 4.

A T-square was applied to the concavely deformed upper or lower surface (20 cm. wide and 100 cm. long) of the structural materials made in the manner described above, and the clearance in mm. between the T-square and the curved surface of the structural materials was measured for the so-called warping deformation.

It will be apparent from the test results shown in Table 5 that the structural materials according to the present invention are quite free from any warping.

TABLE 5

| Test number | 1 | 2 (Reference) |
|---|---|---|
| Base material: | | |
| Composition | Mortar | Mortar |
| Size | Thickness: 2 cm. Width: 20 cm. Length: 100 cm. | Thickness: 2 cm. Width: 20 cm. Length: 100 cm. |
| Polymerizable substance: | | |
| Composition | Methyl methacrylate | Methyl methacrylate |
| Percent by weight relative to base material | 13.4 | 13.5 |
| Polymerization catalyst: | | |
| Composition | Benzoyl peroxide | Benzoyl peroxide |
| Percent by weight relative to polymerizable substance | 2.0 | 2.0 |
| Reaction conditions: | | |
| Atmosphere | Glycerine | Glycerine |
| Temperature (° C.) | 80 | 80 |
| Time (hr.) | 20 | 20 |
| Polymerization ratio, percent.[1] | 94.2 | 94.3 |
| Heat treatment conditions: | | |
| Heating medium | Air | [3] |
| Temp. (° C.) | 160 | [3] |
| Time (hr.) | 3 | [3] |
| Depolymerizing temp. (° C.)[2] | 335 | |
| Warping deformation: Clearance (mm.) | 0 | 4.5 |

[1] The polymerization ratio was separately measured.
[2] The depolymerizing temperature was measured by means of a differential thermometer.
[3] No heat treatment was carried out.

EXAMPLE 6

Base materials shown in Table 6 were pre-cast and thereafter treated in the following manner: The base ma-

TABLE 6

| Test number | 1 | 2 | 3 | 4 | 5 | 6 | 7 | 8 | 9 |
|---|---|---|---|---|---|---|---|---|---|
| | | | | | | | Reference | | |
| Base material: | | | | | | | | | |
| Composition | Mortar | Mortar | Mortar | Mortar | Mortar | Mortar | Mortar | Mortar | Mortar |
| Size | Section: 16 cm.² Length: 16 cm. | Section: 16 cm.² Length: 16 cm. | Section: 16 cm.² Length: 16 cm. | Section: 16 cm.² Length: 16 cm. | Section: 16 cm.² Length: 16 cm. | Section: 16 cm.² Length: 16 cm. | Section: 16 cm.² Length: 16 cm. | Section: 16 cm.² Length: 16 cm. | Section: 16 cm.² Length: 16 cm. |
| Polymerizable substance: | | | | | | | | | |
| Composition | Styrene | Styrene | Styrene | Ethyl methacrylate | Styrene | Styrene | Styrene | Ethyl methacrylate | |
| Percent by weight relative to base material | 15.3 | 15.2 | 15.2 | 15.7 | 1.54 | 15.7 | 15.6 | 15.7 | |
| Polymerization catalyst: | | | | | | | | | |
| Composition | Azobisisobutyronitrile | Dicumyl peroxide | Tertiary butyl per-pivalate | Azobisisobutyronitrile | Benzoyl peroxide | Acetyl peroxide | Cyclohexane peroxide | Benzoyl peroxide | |
| Percent by weight relative to polymerizable substance | 0.5 | 2.0 | 1.0 | 0.5 | 1.0 | 1.0 | 1.0 | 1.0 | |
| Treatment conditions: | | | | | | | | | |
| Atmosphere | Steam | Steam | Steam | Steam | Steam | Steam | Steam | Steam | |
| Temperature (° C.) | 105 | 105 | 105 | 105 | 105 | 105 | 105 | 105 | |
| Time (hr.) | 20 | 20 | 20 | 20 | 20 | 20 | 20 | 20 | |
| Properties: | | | | | | | | | |
| Cracks | None | None | None | None | Present | Present | Present | Present | None |
| Length variation rate (×10⁻⁴) after— | | | | | | | | | |
| 7 days | −0.02 | +0.04 | −0.03 | −0.01 | (*) | (*) | (*) | (*) | +1.2 |
| 1 month | +0.05 | +0.16 | +0.07 | +0.04 | (*) | (*) | (*) | (*) | +3.8 |
| 6 months | +0.13 | +0.22 | +0.14 | +0.09 | (*) | (*) | (*) | (*) | +6.2 |

Note.—The symbol (*) shows that no measurement of the length variation rate was made due to the presence of cracks.

terials used in tests Nos. 1 to 9 in Table 6 were made by thoroughly mixing 520 g. of cement, 1040 g. of standard sand and 338 g. of water together, casting the mixture into molds of 16 cm.² in cross section and 16 cm. long, allowing to stand for 24 hours to cure the same, and removing the castings from the molds.

In tests Nos. 1, 2, 3, 4, 5, 6, 7 and 8 shown in Table 6, the specific compounds or additives shown in the table were mixed with a polymerizable substance in the specified proportions, and the mixtures were impregnated into the base materials of the mortar in the proportions set forth therein. Then, the base materials were each wrapped with a polypropylene film and were treated under the treating conditions shown in Table 6 to obtain structural materials. In test No. 9, the base material of mortar similar to those above-described, but not including any polymerizable substance and specific additive, was subjected to curing in water for one week to obtain a structural material.

The variation of the length, which is the index of dimensional stability, was measured on the structural materials of tests Nos. 1, 2, 3, 4 and 9 in accordance with the method specified in JIS A1125—1957 for the purpose of comparing the dimensional stability of these structural materials. More precisely, a sheet of opal glass was attached to each of the structural materials, and after measuring the original length of the structural materials by means of a comparator, the structural materials were allowed to stand in a chamber maintained at a constant relative humidity of 50% and a constant temperature of 20° C., for the purpose of measuring the length variation rate for the specified periods of time. The length which decreased with the lapse of time was designated (+), while the length which increased with the lapse of time was designated (−). The rate of length variation relative to the original length was calculated and shown in the table.

No measurement of the length variation rate was made on the structural materials of tests Nos. 5, 6, 7 and 8, since cracks developed in these structural materials in the course of the reaction of the polymerizable substances.

What is claimed is:

1. A process for the manufacture of structural materials for use in civil engineering and construction work comprising:
   (1) impregnating a porous base material with a polymerizable synthetic resinous substance,
   (2) immersing the porous base material into a highly viscous liquid which has a viscosity higher than 0.1 poise and which does not substantially react with the polymerizable synthetic resinous substance or the porous base material and is substantially immiscible with the polymerizable synthetic resinous substance, and
   (3) thereafter polymerizing the polymerizable synthetic resinous substance in the thus-immersed porous base material at a temperature of below 110° C. in the presence of a polymerization catalyst, thereby obtaining a structural material containing the reaction product of the polymerizable synthetic resinous substance integrally incorporated into the porous base material.

2. A process according to claim 1, wherein the porous base material is shaped from a raw material selected from the group consisting of a cementitious material, a gypsum-containing material and mixtures thereof, said materials having been hardened by the addition of water thereto.

3. A process according to claim 1, wherein the polymerizable synthetic resinous substance is selected from the group consisting of styrene, acrylonitrile, vinyl acetate, butadiene, chloroprene, isoprene, divinylbenzene, ethylene glycol dimethacrylate, methyl methacrylate and prepolymers thereof, as well as mixtures of the foregoing ingredients.

4. A process according to claim 1 wherein the highly viscous liquid is a member selected from the group consisting of an aqueous solution of sodium alginate, water glass, glycerine, ethylene glycol and silicone oil.

5. A process according to claim 1, wherein the polymerization catalyst is at least one compound selected from the group consisting of an organic peroxide, an inorganic peroxide, and a compound of the general formula:

$$R_1-N=N-R_2$$

wherein $R_1$ and $R_2$ each represents an unsubstituted or a substituted alkyl group, the latter being free from —OOH or —CO—O—O—CO— groups.

6. A process according to claim 1, wherein the polymerization catalyst to be used is added to the raw base material before the base material is cast into the desired shape, or is added to the polymerizable synthetic resinous substance before the polymerizable synthetic resinous substance is impregnated into the porous base material.

7. A process according to claim 1, wherein the porous base material contains a specific additive selected from the group consisting of an aliphatic hydrocarbon having 10 to 30 carbon atoms, an aliphatic alcohol having 3 to 20 carbon atoms, an aliphatic ether having 6 to 40 carbon atoms, a carboxylic acid ester having 6 to 40 carbon atoms, and a carboxylate of an alkaline earth metal and mixtures thereof, which additive has been previously added to the raw porous base material before casting or is mixed with the polymerizable synthetic resinous substance and catalyst and then impregnated into the porous base material.

8. A process according to claim 1, wherein the porous base material is subjected to a heating step after the polymerization reaction at a temperature ranging from 120° C. to either the depolymerization temperature of the polymer produced by the polymerization reaction or 300° C., whichever is lower.

9. A process according to claim 5, wherein the catalyst is selected from lauroyl peroxide, benzoyl peroxide, tertiary butyl perbenzoate, isopropyl-peroxy-carbonate, diethyl peroxide, 2,5-dimethyl - 2,5 - di(tertiary-butyl-peroxy)-hexane, di-cumyl peroxide, tertiary-butyl-cumyl peroxide, or di-tertiary-butyl peroxide, hydrogen peroxide, potassium persulfate, azo-2-methyl - 2 - propane, azo-2-phenyl-2-propane, azo-2-propane, azobisisobutyronitrile.

10. A process according to claim 7, wherein the specific additive is selected from the group consisting of decane, undecane, tetradecane, liquid paraffin, 1-tetradecene, 1-undecene, octadecane, eicosane and 1-nonadecane; octyl alcohol, decyl alcohol, lauryl alcohol, stearyl alcohol, butanediol, hexanediol and glycerine; dibutyl ether, diamyl ether, dihexyl ether and amylhexyl ether; butyl stearate, diheptyl phthalate, di-2-ethylhexyl adipate, ethylene glycol dibenzoate, dioctyl sebacate, octyl-epoxy stearate, and a glycerine ester of a higher aliphatic acid selected from lauric acid, palmitic acid, stearic acid or oleic acid; and calcium propionate, magnesium stearate, barium stearate, calcium laurate, calcium linoleate, calcium phthalate, calcium sebacate and calcium azelate.

11. A process for the manufacture of structural materials for use in civil engineering and construction work comprising:
   (1) impregnating a porous base material which contains calcium oxide or silica or a mixture thereof with a mixture comprising a polymerizable synthetic resinous substance and at least one compound selected from the group consisting of a compound of the general formula:

$$R_1-N=N-R_2$$

wherein $R_1$ and $R_2$ each represents an unsubstituted or substituted alkyl group, the latter being free from —OOH or —CO—O—O—CO— groups, and a compound of the general formula:

$$R_3\text{—O—O—}R_4$$

wherein $R_3$ and $R_4$ each represents an unsubstituted or substituted alkyl group, the latter being free from —CO—O—O—CO— groups, and (2) thereafter polymerizing the polymerizable synthetic resinous substance at a temperature of below 110° C., thereby obtaining a structural material containing the reaction product of the polymerizable synthetic resinous substance integrally incorporated into the porous base material.

12. A process according to claim 11, wherein the polymerization catalyst is selected from azo-2-methyl-2-propane, azo-2-phenyl-2-propane, azo - 2 - propane, azo-bisisobutyronitrile, diethyl peroxide, 2,5-dimethyl-2,5-di(tertiarybutyl-peroxy)-hexane, di-cumyl peroxide, tertiary-butylcumyl peroxide, or di-tertiary-butyl peroxide.

13. A process for the manufacture of structural materials for use in civil engineering and construction work comprising:

(1) impregnating a porous base material shaped from a raw material selected from the group consisting of a cementitious material, a gypsum-containing material and mixtures thereof, said materials having been hardened by the addition of water thereto, with 3 to 30% by weight based on the weight of the porous base material of a polymerizable synthetic resinous substance selected from the group consisting of styrene, acrylonitrile, vinyl acetate, butadiene, chloroprene, isoprene, divinylbenzene, ethylene glycol dimethacrylate, methyl methacrylate, and prepolymers thereof, as well as mixtures of the foregoing ingredients, (2) immersing the porous base material into a highly viscous liquid which has a viscosity higher than 0.1 poise selected from the group consisting of an aqueous solution of sodium alginate, water glass, glycerine, ethylene glycol and silicone oil, (3) thereafter polymerizing the polymerizable synthetic resinous substance in the thus-immersed porous base material at a temperature of below 110° C. in the presence of a polymerization catalyst, and (4) heating the porous base material after the polymerization step at a temperature ranging from 120° C. to either the depolymerization temperature of the polymer produced by the polymerization of said polymerizable substance or 300° C., whichever is lower.

References Cited

UNITED STATES PATENTS

| | | | |
|---|---|---|---|
| 2,740,728 | 4/1956 | Sonnabend et al. | 117—123 X |
| 3,083,118 | 3/1963 | Bridgeford | 117—62.2 X |
| 2,748,028 | 5/1956 | Richardson | 117—126 |
| 2,978,354 | 4/1961 | Lesser | 117—47 |
| 3,485,655 | 12/1969 | Cole et al. | 117—72 X |
| 3,490,936 | 1/1970 | Cole et al. | 117—54 |
| 3,579,369 | 5/1971 | Foster | 117—62.2 X |
| 3,523,032 | 8/1970 | Kujas | 117—54 X |
| 3,133,826 | 5/1964 | Varlet | 117—62.2 |
| 3,116,160 | 12/1963 | Varlet | 117—62.2 |
| 3,563,930 | 2/1971 | Stram et al. | 106—90 X |
| 3,567,496 | 3/1971 | Steinberg et al. | 117—113 |
| 2,772,185 | 11/1956 | Dempster | 117—102 |

FOREIGN PATENTS

| | | | |
|---|---|---|---|
| 1,014,895 | 12/1965 | Great Britain | 117—126 |

OTHER REFERENCES

Kirk-Othmer, Encyclopaedia of Chemical Technology, v. 14, Interscience, 1963, pp. 811–813.

Kirk-Othmer, Encyclopaedia of Chemical Technology, v. 13, p. 351, John Wiley, 1967.

Chemical Abstracts, v. 71, 1969, p. 13785, sec. 13790g.

WILLIAM D. MARTIN, Primary Examiner

M. R. LUSIGNAN, Assistant Examiner

U.S. Cl. X.R.

117—54, 119.6, 122 D, 161 UA, 161 UB, 161 UF

UNITED STATES PATENT OFFICE
CERTIFICATE OF CORRECTION

Patent No. 3,814,619  Dated June 4, 1974

Inventor(s) Sadao Kobayashi, Eiichi Tazawa, Mitsuro Matsunaga, Chikafusa Hoshino and Hideo Kunisaki It is certified that error appears in the above-identified patent and that said Letters Patent are hereby corrected as shown below:

Column 1, in the heading, change the line reading

"to Mitsui Toatsu Chemicals, Inc., Tokyo, Japan", to

--One-half each to: Mitsui Toatsu Chemicals, Inc.

and Taisei Kensetsu Kabushiki Kaisha--.

Signed and sealed this 22nd day of October 1974.

(SEAL)
Attest:

McCOY M. GIBSON JR.
Attesting Officer

C. MARSHALL DANN
Commissioner of Patents